United States Patent
Wang et al.

(10) Patent No.: US 10,921,915 B2
(45) Date of Patent: Feb. 16, 2021

(54) TOUCH PANEL, DISPLAY DEVICE AND DRIVING METHOD THEREOF

(71) Applicants: BOE Technology Group Co., Ltd., Beijing (CN); Beijing BOE Optoelectronics Technology Co., Ltd., Beijing (CN)

(72) Inventors: Haisheng Wang, Beijing (CN); Xue Dong, Beijing (CN); Hailin Xue, Beijing (CN); Xiaochuan Chen, Beijing (CN); Xiaoliang Ding, Beijing (CN); Yingming Liu, Beijing (CN); Shengji Yang, Beijing (CN); Weijie Zhao, Beijing (CN); Changfeng Li, Beijing (CN); Wei Liu, Beijing (CN); Pengpeng Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 241 days.

(21) Appl. No.: 15/519,883

(22) PCT Filed: Aug. 12, 2016

(86) PCT No.: PCT/CN2016/094980
§ 371 (c)(1),
(2) Date: Apr. 18, 2017

(87) PCT Pub. No.: WO2017/063444
PCT Pub. Date: Apr. 20, 2017

(65) Prior Publication Data
US 2017/0242536 A1  Aug. 24, 2017

(30) Foreign Application Priority Data

Oct. 15, 2015  (CN) .......................... 2015 1 0665956
Dec. 4, 2015   (CN) .......................... 2015 1 0886406

(51) Int. Cl.
*G06F 3/041* (2006.01)
*G06F 3/044* (2006.01)

(52) U.S. Cl.
CPC .......... *G06F 3/0412* (2013.01); *G06F 3/0445* (2019.05); *G06F 3/0447* (2019.05); *G06F 3/04166* (2019.05); *G06F 2203/04105* (2013.01)

(58) Field of Classification Search
CPC ...... G06F 3/0416; G06F 3/0412; G06F 3/044; G06F 2203/04105
See application file for complete search history.

(56) References Cited

U.S. PATENT DOCUMENTS

| 2009/0160822 A1* | 6/2009 | Eguchi | G06F 3/044 345/174 |
| 2012/0062469 A1* | 3/2012 | Guard | G06F 3/044 345/173 |

(Continued)

FOREIGN PATENT DOCUMENTS

| CN | 101866228 A | 10/2010 |
| CN | 102004573 A | 4/2011 |

(Continued)

OTHER PUBLICATIONS

English Translation of Chinese Patent Publication 103823592 published on May 28, 2014.*

(Continued)

*Primary Examiner* — Patrick N Edouard
*Assistant Examiner* — Eboni N Giles
(74) *Attorney, Agent, or Firm* — Banner & Witcoff, Ltd.

(57) ABSTRACT

A touch panel, a display device and a driving method thereof are provided. The touch panel includes: an array substrate, an opposing substrate and touch pressure-sensitive electrodes. The opposing substrate is arranged opposite to the (Continued)

array substrate; and the touch pressure-sensitive electrodes are disposed on a bottom layer on a side of the array substrate facing the opposing substrate and configured to form a capacitor structure together with a metal layer disposed on a side of the array substrate away from the opposing substrate, so as to sense pressure touch.

18 Claims, 2 Drawing Sheets

(56) References Cited

U.S. PATENT DOCUMENTS

| | | | |
|---|---|---|---|
| 2012/0153292 A1 | 6/2012 | Nakamura et al. | |
| 2014/0198268 A1* | 7/2014 | Sugita | G06F 3/0443 |
| | | | 349/12 |
| 2014/0247239 A1 | 9/2014 | Jamshidi-Roudbari et al. | |
| 2014/0375911 A1* | 12/2014 | Lee | G06F 3/0412 |
| | | | 349/12 |
| 2015/0177880 A1* | 6/2015 | Shin | G06F 3/044 |
| | | | 345/174 |
| 2015/0325171 A1* | 11/2015 | Zhou | G09G 3/3233 |
| | | | 345/80 |
| 2015/0382446 A1 | 12/2015 | Kwon et al. | |
| 2016/0132155 A1* | 5/2016 | Lee | G06F 3/044 |
| | | | 345/174 |
| 2016/0187695 A1* | 6/2016 | Cho | G02F 1/13338 |
| | | | 349/12 |
| 2016/0334903 A1* | 11/2016 | Shepelev | G06F 3/0414 |
| 2017/0024038 A1* | 1/2017 | Noguchi | G06F 3/044 |

FOREIGN PATENT DOCUMENTS

| | | |
|---|---|---|
| CN | 102262488 A | 11/2011 |
| CN | 103034377 A | 4/2013 |
| CN | 103823592 A | 5/2014 |
| CN | 204965385 U | 1/2016 |
| CN | 105528110 A | 4/2016 |
| JP | 2011170659 A | 9/2011 |
| WO | 2015153668 A1 | 10/2015 |

OTHER PUBLICATIONS

Jun. 12, 2018—U.S. Office Action U.S. Appl. No. 15/329,977.
Nov. 16, 2017—(CN) First Office Action Appn 201510886406.9 with English Tran.
Nov. 16, 2016—(WO) International Search Report and Written Opinion Appn PCT/CN2016/094980 with English Tran.

* cited by examiner

TOUCH PANEL, DISPLAY DEVICE AND DRIVING METHOD THEREOF

The application is a U.S. National Phase Entry of International Application No. PCT/CN2016/094980 filed on Aug. 12, 2016, designating the United States of America and claiming priority to Chinese Patent Application Nos. 201510886406.9, filed on Dec. 4, 2015, and 201510665956.8, filed on Oct. 15, 2015. The present application claims priority to and the benefit of the above-identified applications and the above-identified applications are incorporated by reference herein in their entirety.

TECHNICAL FIELD

Embodiments of the present disclosure relate to a touch panel, a display device and a driving method thereof.

BACKGROUND

Pressure-sensitive technology is technology capable of detecting via an external force. The technology has been applied in the fields of industrial control, medical treatment and the like in the far past. Currently, in the display field, particularly in the field of mobile phones or tablets, the means for achieving pressure sensing is to add an additional mechanism on a backlight part of a liquid crystal display (LCD) panel or a middle-bezel part of a mobile phone. The design requires modification on the structural design of the LCD panel or the mobile phone. Moreover, as the fit tolerance is large, the detection accuracy of the design is also limited.

Therefore, how to achieve pressure sensing with high detection accuracy in the case of small modification on the hardware of the display panel is the problem to be solved by those skilled in the art.

SUMMARY

The embodiments of the disclosure provide a touch panel, a display device and a driving method thereof, so as to realize detection of pressure sensing with high accuracy in the touch panel. In the touch panel, the touch pressure-sensitive electrodes disposed on the bottom layer on one side of the array substrate facing the opposing substrate are added; the capacitor structure may be formed by the added touch pressure-sensitive electrodes and the metal layer disposed below the array substrate; and when the position of the touch pressure-sensitive electrode is pressed, the distance between the touch pressure-sensitive electrode and the metal layer changes, and the capacitance between both changes as well. Therefore, the touch panel realizes the touch detection function, and determines the pressure at the touch position by detecting the capacitance variation of the touch pressure-sensitive electrodes and achieves the pressure sensing function. For the touch panel, the pressure sensing function can be achieved in the process of touch detection. The touch panel has small modification on the structural design of the display device, avoids the limitation of fitting tolerance, and hence can obtain better detection accuracy and reduce the production cost.

At least one embodiment of the disclosure provides a touch panel, comprising: an array substrate; an opposing substrate arranged opposite to the array substrate; and touch pressure-sensitive electrodes disposed on a bottom layer on a side of the array substrate facing the opposing substrate and configured to form a capacitor structure together with a metal layer disposed on a side of the array substrate away from the opposing substrate, so as to sense pressure touch.

At least one embodiment of the disclosure provides a display device, comprising: a touch panel; and a metal layer disposed on a side of an array substrate of the touch panel away from an opposing substrate, wherein the touch panel includes the touch panel as mentioned above.

At least one embodiment of the disclosure provides driving a method of a display device comprising: simultaneously applying touch detection signals to the touch detection electrodes and the touch pressure-sensitive electrodes in a touch period of the time to display each frame of the touch panel; determining a touch position by detecting a capacitance variation of the touch detection electrodes; and determining a pressure at the touch position by detecting the capacitance variation of the touch pressure-sensitive electrodes.

BRIEF DESCRIPTION OF THE DRAWINGS

Simple description will be given below to the accompanying drawings required to be used in the description of the embodiments to provide a more clear understanding of the technical proposals of the embodiments of the present disclosure. Obviously, the drawings described below only involve some embodiments of the present disclosure. Other drawings may also be obtained by those skilled in the art without creative efforts on the basis of the accompanying drawings.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure. In addition, the thickness and the shape of various layers in the accompanying drawings do not reflect true scale and are only intended to illustrate the content of the present disclosure.

Unless otherwise specified, the technical terms or scientific terms used in the disclosure shall have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly.

Embodiments of the present disclosure provide a touch panel, a display device and a driving method thereof. The touch panel comprises an array substrate, an opposing substrate arranged opposite to the array substrate, and touch pressure-sensitive electrodes. The touch pressure-sensitive electrodes are disposed at the bottom of a side of the array substrate facing the opposing substrate and configured to form a capacitor structure together with a metal layer disposed on a side of the array substrate away from the opposing substrate, so as to sense pressure touch. Thus, when a position provided with the touch pressure-sensitive electrode is pressed, the distance between the touch pressure-sensitive electrode and the metal layer changes, and the capacitance between both changes as well. Therefore, the touch panel can achieve pressure sensing function. Moreover, the touch panel has small modification on the structural design of the display device, avoids the limitation of fitting tolerance, and hence can obtain better detection accuracy and reduce the production cost.

Detailed description will be given below to the touch panel, the display device and the driving method thereof, provided by the embodiment of the present disclosure, with reference to the accompanying drawings.

First Embodiment

Figure 1:
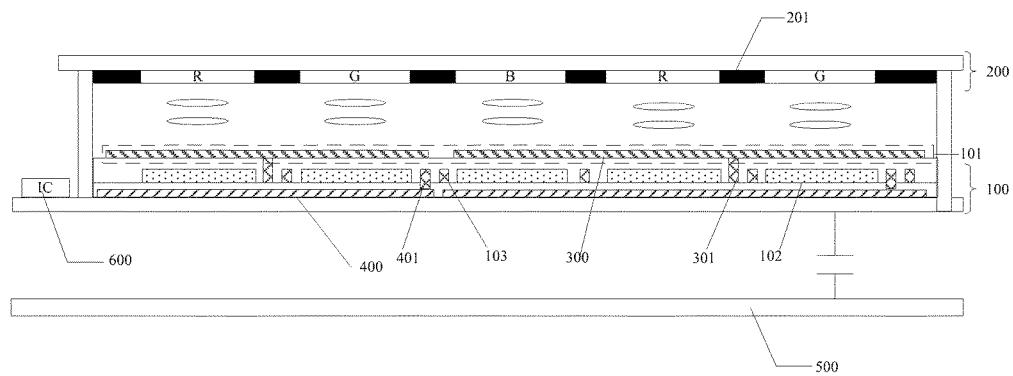
FIG. 1 is a schematic structural view of an in-cell touch panel provided by the embodiment of the present disclosure.

Description is given in the embodiment by taking an in-cell touch panel as an example. The embodiment provides an in-cell touch panel, which, as illustrated in FIG. 1, comprises an array substrate 100 and an opposing substrate 200 which are arranged opposite to each other, and touch detection electrodes 300 disposed on a side of the array substrate 100 facing the opposing substrate 200 and/or a side of the opposing substrate 200 facing the array substrate 100. Description is given in FIG. 1 by taking the case that the touch detection electrodes 300 are disposed on the array substrate 100 as an example. The in-cell touch panel further comprises:

touch pressure-sensitive electrodes 400 which are disposed on a bottom layer (at the bottom) of a side of the array substrate 100 facing the opposing substrate 200 and may form a capacitor structure together with a metal layer 500 disposed below the array substrate 100. It should be noted that the bottom layer refers to a layer formed on the array substrate at first and a layer closest to a base substrate. That is to say, the touch pressure-sensitive electrodes may be directly disposed on the base substrate, and other layer structures of the array substrate are disposed on the touch pressure-sensitive electrodes and the base substrate. In addition, the description "disposed below the array substrate" refers to being disposed on a side of the array substrate away from the opposing substrate and spaced from the array substrate at a certain distance.

In the touch period, touch detection signals may be simultaneously applied to the touch detection electrodes 300 and the touch pressure-sensitive electrodes 400; a touch position is determined by detecting the capacitance variation of the touch detection electrodes 300; and the pressure at the touch position is determined by detecting the capacitance variation of the touch pressure-sensitive electrodes 400. It should be noted that the processes may be achieved by a touch detection chip 600.

In the in-cell touch panel provided by the embodiment, the touch pressure-sensitive electrodes 400 disposed on the bottom layer on a side of the array substrate 100 facing the opposing substrate 200 are added in the structure of the in-cell touch panel; the capacitor structure may be formed by the added touch pressure-sensitive electrodes 400 and the metal layer 500 disposed below the array substrate 100; when a position of the touch pressure-sensitive electrode 400 is pressed, the distance between the touch pressure-sensitive electrode 400 and the metal layer 500 changes, and the capacitance between both changes as well. Thus, in the touch period, the touch detection chip 600 may simultaneously apply the touch detection signals to the touch detection electrodes 300 and the touch pressure-sensitive electrodes 400, determine the touch position by detecting the capacitance variation of the touch detection electrodes 300 and achieve touch detection function, and determine the pressure at the touch position by detecting the capacitance variation of the touch pressure-sensitive electrodes 400 and achieve pressure sensing function. The in-cell touch panel provided by the embodiment of the present disclosure allows the touch pressure-sensitive electrodes 400 to be integrated into the touch panel, achieves the function of pressure sensing in the process of touch detection, has small modification on the structural design of the display device, avoids the limitation of fitting tolerance, and can obtain better detection accuracy and reduce the production cost.

For instance, in the in-cell touch panel provided by the embodiment, the added touch pressure-sensitive electrodes 400 may be made from metallic materials and may also be made from transparent conductive materials.

For instance, when the touch pressure-sensitive electrodes are made from metallic materials, for the added touch pressure-sensitive electrodes 400 to not affect the aperture ratio of a display area, patterns of the touch pressure-sensitive electrodes 400 will generally be shielded by patterns of a BM layer 201, namely an orthographic projection of each pattern of the touch pressure-sensitive electrodes 400 on the array substrate falls within a region provided with the patterns of the BM layer 201. That is to say, the orthographic projection of each of the touch pressure-sensitive electrodes 400 on the array substrate falls within the orthographic projection of the BM layer 201 on the array substrate.

For instance, when the touch pressure-sensitive electrodes 400 are made from transparent conductive materials, the touch pressure-sensitive electrodes 400 are transparent electrodes. In order to not affect the uniformity of light transmission rate in the display of the touch panel, each of the touch pressure-sensitive electrodes 400 may be set to cover a plurality of pixels, namely an orthographic projection of the gap among the touch pressure-sensitive electrodes 400 falls within the region provided with the patterns of the BM layer 201. That is to say, the orthographic projection of the gap among the touch pressure-sensitive electrodes 400 on the array substrate falls within the orthographic projection of the BM layer 201 on the array substrate. As illustrated in FIG. 1, the BM layer 201 may be specifically disposed on a side of the opposing substrate facing the array substrate 100. Of course, the embodiment of the present disclosure includes but not limited thereto. The BM layer may also be disposed on a side of the array substrate 100 facing the opposing substrate 200.

For instance, in the in-cell touch panel provided by the embodiment, the size and the gap of the touch pressure-sensitive electrodes 400 may be specifically set according to the accuracy of the touch pressure required to be specifically detected. Moreover, as the in-cell touch panel is generally fixed on an outer frame of a display device by utilization of a border region, when a central region and a boundary region of the in-cell touch panel are pressed by the same force, the touch pressure-sensitive electrodes 400 in the central region can more easily convert the pressure into the distance change between the touch pressure-sensitive electrodes and the metal layer 500 disposed below, namely the central region is more sensitive to pressure. Therefore, in specific design, in order to obtain relatively uniform pressure sensing sensitivity on the entire touch panel, the areas of the touch pressure-sensitive electrodes 400 on the array substrate 100 may be gradually increased along the direction from the central region of the array substrate 100 to the boundary region.

For instance, in the touch period, for the distance change between the touch pressure-sensitive electrode 400 and the metal layer 500 below the screen, caused by screen deformation when the finger presses the touch panel, to only affect the capacitance of the capacitor structure between the touch pressure-sensitive electrode 400 and the metal layer 500 and result in the change of the touch detection signal applied to the touch pressure-sensitive electrode 400, and to not interfere with the capacitance variation of the touch detection electrode 300, in the touch panel provided by the embodiment, as illustrated in FIG. 1, the orthographic projection of each of the touch pressure-sensitive electrodes 400 on the array substrate will generally cover an orthographic projection of at least one touch detection electrode 300, so as to shield the interference of the metal layer 500 disposed below the screen on the detection of the touch detection signal applied to the touch detection electrode 300 when the screen is pressed.

For instance, as illustrated in FIG. 1, on the array substrate, the touch panel provided by the embodiment generally further comprises: a common electrode layer 101 and pixel electrodes 102, wherein positions of the common electrode layer 101 and the pixel electrodes 102 may be exchanged. That is to say, the common electrode layer 101 may be taken as a plate electrode and disposed on a lower layer (closer to the base substrate), and the pixel electrodes 102 are taken as slit electrodes and disposed on an upper layer (closer to a liquid crystal layer); or the pixel electrodes 102 may also be taken as a plate electrode and disposed on the lower layer (closer to the base substrate), and the common electrode layer 101 is taken as slit electrodes and disposed on the upper layer (closer to the liquid crystal layer). Of course, the embodiment of the present disclosure includes but not limited thereto. The common electrode layer 101 may also be disposed on the opposing substrate 200 arranged opposite to the array substrate 100, namely the array substrate 100 is not provided with the common electrode layer 101.

For instance, in the in-cell touch panel provided by the embodiment of the present disclosure, the specific structure of the touch detection electrode used for touch detection may have a plurality of implementations. For instance, the touch detection electrodes 300 may be formed by a plurality of self-capacitive electrodes which are arranged in the same layer and independent of each other; or the touch detection electrodes 300 may also be formed by touch driving electrodes and touch sensing electrodes which are intercrossed with each other.

For instance, when the self-capacitive electrodes are adopted to achieve touch detection function, the common electrode layer 101 in the array substrate 100 may be multiplexed as the self-capacitive electrodes, namely the common electrode layer 101 on the array substrate 100 is formed by the self-capacitive electrodes. As illustrated in FIG. 1, when the structure of the common electrode layer 101 is modified and divided into the self-capacitive electrodes, no additional process is required on the basis of the conventional manufacturing process of the array substrate, so that the production cost can be reduced and the production efficiency can be improved.

Figure 2:
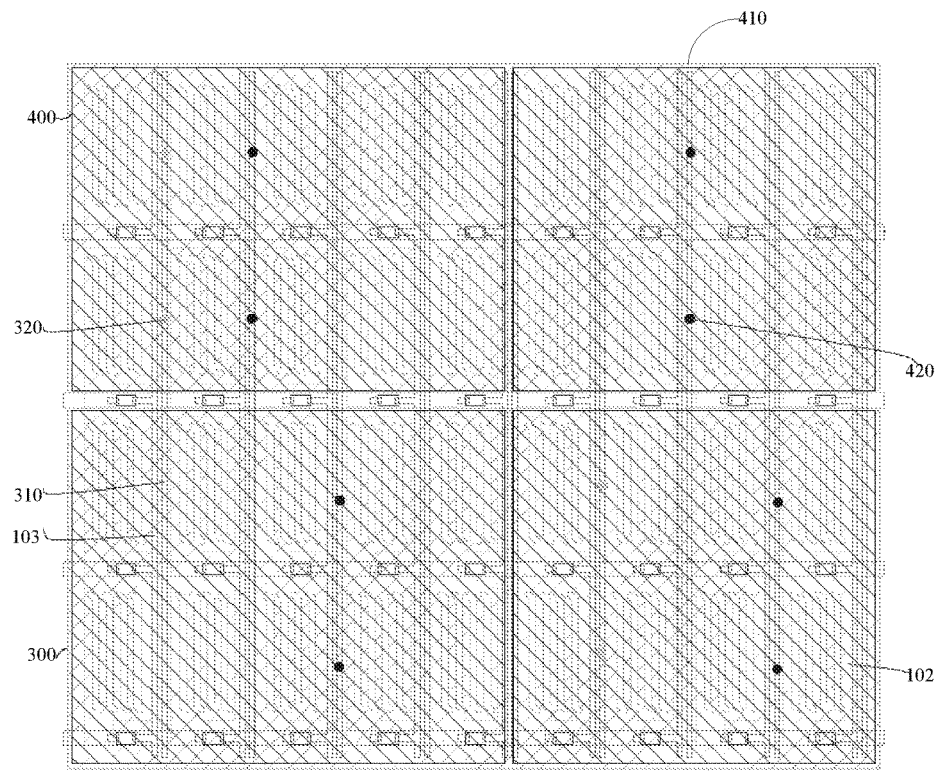
FIG. 2 is a schematic top view of an array substrate in the in-cell touch panel provided by the embodiment of the present disclosure.

For instance, as illustrated in FIGS. 1 and 2, the touch panel provided by the embodiment will generally further comprise: first electrode leads 410 connected with the touch pressure-sensitive electrodes 400, and second electrode leads 310 connected with the touch detection electrodes 300. For instance, the first electrode leads 410 and the second electrode leads 310 may be set to have same extension direction and be arranged in the same layer with data lines 103 in the array substrate 100. Thus, no additional process is required on the basis of the conventional manufacturing process of the array substrate, so that the production cost can be reduced and the production efficiency can be improved. Moreover, the touch pressure-sensitive electrodes 400 are connected with corresponding first electrode leads 410 via first through holes 420, and the touch detection electrodes 300 are connected with the second electrode leads 310 via second through holes 320.

Figure 3:
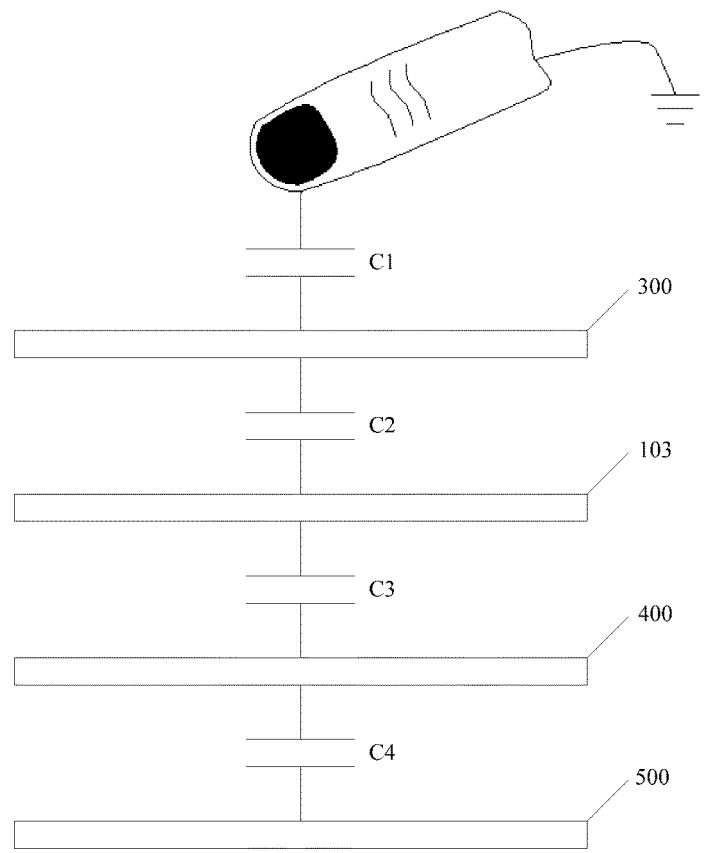
FIG. 3 is a schematic diagram of the in-cell touch panel provided by the embodiment of the present disclosure.

For instance, as illustrated in FIG. 1, when the self-capacitive electrodes for forming the common electrode layer 101 are disposed above the pixel electrodes 102 in the array substrate 100, as illustrated in FIG. 3, the pixel electrodes 102 are disposed between the touch detection electrodes 300 and the touch pressure-sensitive electrodes 400. Thus, the pixel electrodes 102 may form storage capacitance Cst together with electrodes on both the upper layer and the lower layer. The storage capacitance Cst is the sum of the capacitance C2 formed between the pixel electrodes and the touch detection electrodes 300 and the capacitance C3 formed between the pixel electrodes 102 and the touch pressure-sensitive electrodes 400. As for touch panels with relatively high resolution, as pixels thereof are very small, the storage capacitance formed between corresponding pixel electrodes 102 and the common electrode layer 101 will also be very small. The touch pressure-sensitive electrodes 400 added in the touch panel provided by the embodiment of the present disclosure can also achieve the objective of increasing the storage capacitance, which is favorable for high-PPI touch panel products.

For instance, in the in-cell touch panel provided by the embodiment of the present disclosure, the orthographic projections of the pixel electrodes of the array substrate on the array substrate and the orthographic projections of the touch pressure-sensitive electrodes on the array substrate are at least partially overlapped. Thus, the storage capacitance can be better formed between the pixel electrodes and the touch pressure-sensitive electrodes.

For instance, in the in-cell touch panel provided by the embodiment of the present disclosure, in order to reduce the mutual interference between display and touch signals, for instance, the means of time-sharing driving in the touch period and the display period may be adopted. Moreover, for instance, a display driver IC and the touch detection chip may also be integrated into one chip, so that the production cost can be further reduced.

Figure 4:
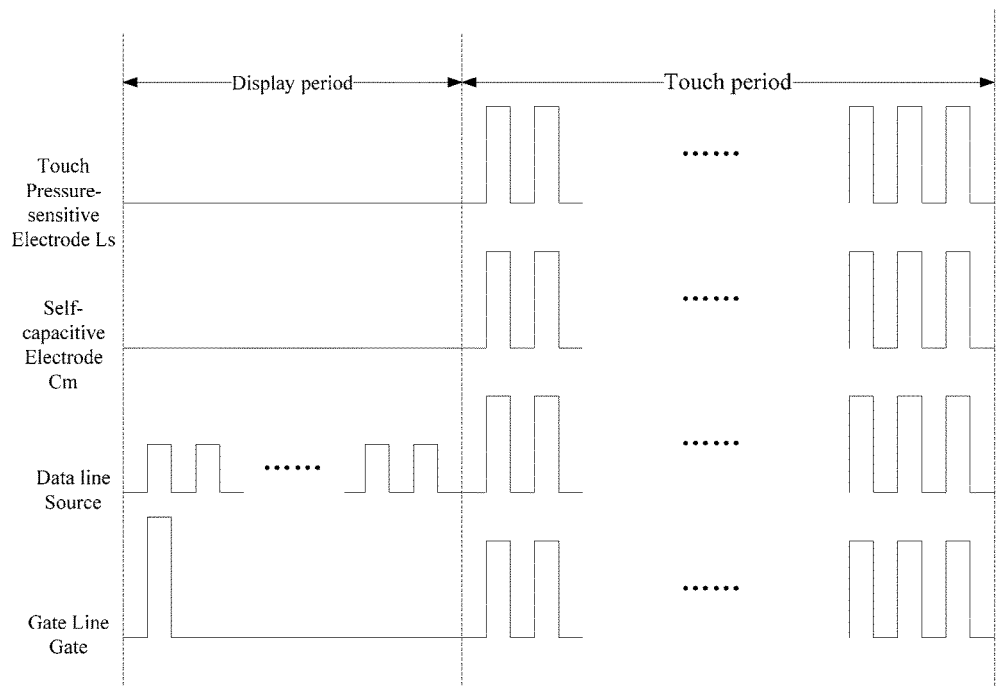
FIG. 4 is a schematic diagram illustrating the driving timing sequence of the in-cell touch panel provided by the embodiment of the present disclosure.

For instance, in the driving timing sequence diagram as illustrated in FIG. 4, the time of displaying each frame (V-sync) of the touch panel is divided into display period and touch period. In the display period, gate scanning signals are sequentially applied to each gate line Gate in the touch panel, and gray scale signals are applied to data lines Source; and when the common electrode layer is multiplexed as the self-capacitive electrodes, the touch detection chip connected with the self-capacitive electrodes Cm is configured to respectively apply common electrode signals to the self-capacitive electrodes Cm, so as to achieve LCD function. In the touch period, as illustrated in FIG. 4, the touch detection chip connected with the self-capacitive electrodes Cm is configured to simultaneously apply touch detection signals to the self-capacitive electrodes Cm and touch pressure-sensitive electrodes Ls, simultaneously receive feedback signals of the self-capacitive electrodes Cm and the touch pressure-sensitive electrodes Ls, and determine whether touch occurs and the sensing pressure by the analysis of the feedback signals, so as to simultaneously achieve the functions of touch and pressure sensing.

For instance, the detection of the touch position and the detection of the pressure at the touch position in the touch period may be simultaneously performed and may also be performed by time-sharing means. In the time-sharing process, the touch period may be specifically divided into touch detection period and pressure detection period, wherein, in the touch detection period, first touch detection signals are simultaneously applied to the touch detection electrodes and the touch pressure-sensitive electrodes, and the touch position is determined by detecting the capacitance variation of the touch detection electrodes; and in the pressure detection period, second touch detection signals are simultaneously applied to the touch detection electrodes and the touch pressure-sensitive electrodes, and the pressure at the touch position is determined by detecting the capacitance variation of the touch pressure-sensitive electrodes, in which the first touch detection signal and the second touch detection signal may be the same and may also be different. No limitation will be given here.

For instance, as illustrated in FIG. 4, in order to prevent the earth capacitance, produced between the gate lines and the data lines and the touch detection electrodes and the touch pressure-sensitive electrodes in the array substrate in the touch period, from affecting the accuracy of touch detection and pressure sensing, for instance, in the touch period, electrical signals having the same amplitude with the touch detection signals may be applied to the gate lines (Gate) and the data lines (Source) in the array substrate, so that the ground capacitance between the gate lines (Gate) and the data lines (Source) and the touch detection electrodes and the touch pressure-sensitive electrodes can be eliminated, and hence the accuracy of touch detection and pressure sensing can be improved.

It should be noted that the touch panel provided by the embodiment of the present disclosure may be specifically applied in LCDs, may also be applied in organic light-emitting diode (OLED) display panels, and may also be applied in other display panels. No limitation will be given here. In addition, description is given in the embodiment by taking the in-cell touch panel as an example. However, the embodiment of the present disclosure includes but not limited thereto. The touch panel provided by the embodiment of the present disclosure may also include on-cell touch panels and touch panels with other structures.

Second Embodiment

On the basis of the same disclosure concept, the embodiment provides a display device, which comprises the touch panel provided by the embodiment of the present disclosure, and a metal layer disposed blow the array substrate of the in-cell touch panel. The display device may be: any product or component with display function such as a mobile phone, a tablet PC, a TV, a display, a notebook computer, a digital picture frame and a navigator. The embodiments of the display device may refer to the embodiments of the in-cell touch panel. No further description will be given here.

For instance, when the display device provided by the embodiment of the present disclosure is a mobile phone, the metal layer disposed below the touch panel may be a middle bezel of the mobile phone; and when the touch panel of the display device provided by the embodiment of the present disclosure adopts an LCD panel, the metal layer disposed below the touch panel may be backlight metal on the back of a backlight module. Moreover, the backlight metal may be a metal frame coated on the outside of the backlight module and may also be a metal patch coated on the back of the backlight module. No limitation will be given here.

Third Embodiment

On the basis of the same disclosure concept, the embodiment provides a driving method of the display device, which comprises: in the touch period of the time to display each frame of the touch panel, simultaneously applying touch detection signals to the touch detection electrodes and the touch pressure-sensitive electrodes, determining the touch position by detecting the capacitance variation of the touch detection electrodes, and determining the pressure at the touch position by detecting the capacitance variation of the touch pressure-sensitive electrodes.

For instance, the detection of the touch position and the detection of the pressure at the touch position in the touch period may be simultaneously performed and may also be performed by time-sharing means. In the time-sharing process, the touch period may be specifically divided into touch detection period and pressure detection period.

For instance, in the touch detection period, first touch detection signals are simultaneously applied to the touch detection electrodes and the touch pressure-sensitive electrodes, and the touch position is determined by detecting the capacitance variation of the touch detection electrodes; and in the pressure detection period, second touch detection signals are simultaneously applied to the touch detection electrodes and the touch pressure-sensitive electrodes, and the pressure at the touch position is determined by detecting the capacitance variation of the touch pressure-sensitive electrodes, in which the first touch detection signal and the second touch detection signal may be the same and may also be different. No limitation will be given here.

For instance, the driving method further comprises: in the touch period, applying electrical signals having the same amplitude with the touch detection signals to the gate lines and the data lines in the array substrate.

In the touch panel, the display device and the driving method thereof, provided by the embodiment of the present disclosure, the touch pressure-sensitive electrodes disposed on the bottom layer on one side of the array substrate facing the opposing substrate are added in the structure of the in-cell touch panel; the capacitor structure may be formed by the added touch pressure-sensitive electrodes and the metal layer disposed below the array substrate; and when the position of the touch pressure-sensitive electrode is pressed, the distance between the touch pressure-sensitive electrode and the metal layer changes, and the capacitance between both changes as well. Therefore, in the touch period, the touch detection chip can simultaneously apply the touch detection signals to the touch detection electrodes and the touch pressure-sensitive electrodes, determine the touch position by detecting the capacitance variation of the touch detection electrodes and achieve the touch detection function, and determine the pressure at the touch position by detecting the capacitance variation of the touch pressure-sensitive electrodes and achieve the pressure sensing function. In the in-cell touch panel provided by the embodiment of the present disclosure, the touch pressure-sensitive electrodes are integrated into the touch panel, so that the pressure sensing function can be simultaneously achieved in the process of touch detection. The embodiment has small modification on the structural design of the display device, avoids the limitation of fitting tolerance, and hence can obtain better detection accuracy and reduce the production cost.

The foregoing is only preferred embodiments of the present disclosure and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

The application claims priorities to the Chinese patent applications No. 201510886406.9, filed on Dec. 4, 2015, and No. 201510665956.8, filed on Oct. 15, 2015, the disclosure of which is incorporated herein by reference as part of the application.

The invention claimed is:

1. A touch panel, comprising: an array substrate; an opposing substrate arranged opposite to the array substrate; touch detection electrodes disposed on a side of the array substrate facing the opposing substrate; touch pressure-sensitive electrodes disposed on a bottom layer on a side of the array substrate facing the opposing substrate, wherein the touch pressure-sensitive electrodes are configured to form a capacitor structure together with a metal layer disposed on a side of the array substrate away from the opposing substrate; so as to sense pressure touch, wherein the touch pressure-sensitive electrodes are directly disposed on the array substrate;

the metal layer disposed on the side of the array substrate away from the opposing substrate, wherein the touch detection electrodes are configured to form a capacitor structure with a pixel electrode in the array substrate, the pixel electrode is configured to form a capacitor structure with the touch pressure-sensitive electrodes, and the capacitor structure formed by the touch pressure-sensitive electrodes and the metal layer, the capacitor structure formed by the pixel electrode and the touch pressure-sensitive electrodes, and the capacitor structure formed by the pixel electrode and the touch detection electrodes are sequentially connected in series, the pixel electrode and data lines are arranged in a same layer, and the metal layer, the touch pressure-sensitive electrodes, and the touch detection electrodes are sequentially arranged; and a black matrix (BM) layer disposed on a side of the opposing substrate facing the array substrate or disposed on a side of the array substrate facing the opposing substrate, wherein the touch pressure-sensitive electrodes are transparent electrodes, and an orthographic projection of a gap among the touch pressure-sensitive electrodes on the array substrate entirely falls within an orthographic projection of a pattern of the BM layer on the array substrate.

2. The touch panel according to claim 1, wherein the touch pressure-sensitive electrodes are made of a metallic material.

3. The touch panel according to claim 1, wherein a touch detection chip is configured to simultaneously apply touch detection signals to the touch detection electrodes and the touch pressure-sensitive electrodes in a touch period, determine a touch position by detecting a capacitance variation of the touch detection electrodes, and determine a pressure at the touch position by detecting the capacitance variation of the touch pressure-sensitive electrodes.

4. The touch panel according to claim 1, wherein an orthographic projection of each of the touch pressure-sensitive electrodes on the array substrate covers an orthographic projection of at least one of the touch detection electrodes on the array substrate.

5. The touch panel according to claim 1, wherein the touch detection electrodes are a plurality of self-capacitive electrodes which are arranged in a same layer and independent of each other.

6. The touch panel according to claim 5, wherein a common electrode layer in the array substrate is formed by the self-capacitive electrodes.

7. The touch panel according to claim 6, wherein the common electrode layer is disposed above a layer of a pixel electrode in the array substrate.

8. The touch panel according to claim 1, wherein orthographic projections of pixel electrodes of the array substrate on the array substrate and orthographic projections of the touch pressure-sensitive electrodes on the array substrate are at least partially overlapped.

9. The touch panel according to claim 1, further comprising:
    first electrode leads connected with the touch pressure-sensitive electrodes; and
    second electrode leads connected with the touch detection electrodes, wherein the first electrode leads and the second electrode leads have a same extension direction and are arranged in a same layer with data lines in the array substrate.

10. The touch panel according to claim 3, wherein in the touch period, electrical signals having a same amplitude with the touch detection signals are applied to gate lines and data lines in the array substrate.

11. A display device, comprising:
    the touch panel according to claim 1; and
    the metal layer disposed on the side of the array substrate away from the opposing substrate.

12. The display device according to claim 11, wherein the metal layer comprises a backlight metal on a back of a backlight module or a middle bezel of a mobile phone.

13. The touch panel according to claim 1, wherein areas of the touch pressure-sensitive electrodes on the array substrate are gradually increased along a direction from a central region of the array substrate to a boundary region.

14. The touch panel according to claim 1, wherein an orthographic projection of each of the touch pressure-sensitive electrodes on the array substrate falls within an orthographic projection of the BM layer on the array substrate.

15. A driving method of a display device, the display device comprising:
    a touch panel, wherein the touch panel comprises an array substrate, an opposing substrate arranged opposite to the array substrate, touch detection electrodes disposed on a side of the array substrate facing the opposing substrate, and touch pressure-sensitive electrodes disposed on a bottom layer on a side of the array substrate facing the opposing substrate, wherein the touch pressure-sensitive electrodes are configured to form a capacitor structure together with a metal layer disposed on a side of the array substrate away from the opposing substrate, so as to sense pressure touch; and the metal layer disposed on the side of the array substrate of the touch panel away from the opposing substrate, wherein the touch pressure-sensitive electrodes are directly disposed on the array substrate, the touch panel further comprises a black matrix (BM) layer disposed on a side of the opposing substrate facing the array substrate or disposed on a side of the array substrate facing the opposing substrate, wherein the touch detection electrodes are configured to form a capacitor structure with a pixel electrode in the array substrate, the pixel electrode is configured to form a capacitor structure with the touch pressure-sensitive electrodes, and the capacitor structure formed by the touch pressure-sensitive electrodes and the metal layer, the capacitor structure formed by the pixel electrode and the touch pressure-sensitive electrodes, and the capacitor structure formed by the pixel electrode and the touch detection are arranged in a same layer, and the metal layer, the touch pressure-sensitive electrodes, and the touch detection electrodes are sequentially arranged, the touch pressure-sensitive electrodes are transparent electrodes, and an orthographic projection of a gap among the touch pressure-sensitive electrodes on the array substrate entirely falls within an orthographic projection of a pattern of the BM layer on the array substrate, wherein the method comprises: simultaneously applying touch detection signals to the touch detection electrodes and the touch pressure-sensitive electrodes during a touch period of a time to display each frame of the touch panel; determining a touch position by detecting a capacitance variation of the touch detection electrodes; and determining a pressure at the touch position by detecting the capacitance variation of the touch pressure-sensitive electrodes.

16. The driving method according to claim 15, further comprising:
applying electrical signals having a same amplitude with the touch detection signals to gate lines and data lines in the array substrate during the touch period.

17. The driving method according to claim 15, wherein areas of the touch pressure-sensitive electrodes on the array substrate are gradually increased along a direction from a central region of the array substrate to a boundary region.

18. The driving method according to claim 15, wherein an orthographic projection of each of the touch pressure-sensitive electrodes on the array substrate falls within an orthographic projection of the BM layer on the array substrate.

* * * * *